United States Patent Office 3,405,055
Patented Oct. 8, 1968

3,405,055
METAL-CONTAINING CRYSTALLINE ALUMINO-SILICATE CATALYSTS
Clarence W. Bittner, Orinda, Calif., assignor to Shell Oil Company, New York, N.Y., a corporation of Delaware
No Drawing. Filed Aug. 1, 1966, Ser. No. 569,081
11 Claims. (Cl. 208—111)

ABSTRACT OF THE DISCLOSURE

A catalyst and hydroconversion process using the catalyst comprising transitional metals incorporated into a crystalline zeolite in excess of the ion-exchange capacity of the zeolite by using a metal ion-exchange solution of greater than 6 pH.

---

This invention relates to crystalline aluminosilicate catalysts and more particularly to such catalysts containing a relatively high proportion of catalytically active metals, and conversion reactions therewith.

Crystalline aluminosilicates, both natural and synthetic, in various forms are widely known. Discussions of mineral silicates are available in many literature sources such as Kirk-Othmer's Encyclopedia of Chemical Technology, vol. 12, starting at page 276 (interscience Encyclopedia, Inc., New York) and "Molecular Sieves" by R. M. Barrer, Endeavor, vol. XXIII, No. 90, September 1964, at page 122. In general, the crystalline aluminosilicates can be divided into three separate classes; namely, frameworks of three dimensional nature, frameworks with a layer tendency and frameworks with a fibrous tendency. Crystalline aluminosilicates having two-dimensional and three-dimensional frameworks have found acceptance as catalysts in the chemical and petroleum industries. Silicate minerals of the two-dimensional class have a layer crystal structure, such as the montmorillonite-like and mica-like clay minerals. Mineral silicates of the three-dimensional type are represented by, for example, faujasite, mordenite and the like. A wide number of synthetic crystalline aluminosilicates are available commercially.

For many chemical hydrocarbon conversion reactions it is frequently desired to compose a catalytic metal with the crystalline aluminosilicate. For example, silver on zeolites as a catalyst for methanol to formaldehyde oxida- has been investigated by Russian scientists. Methanol synthesis employing zinc or zinc oxide on zeolite is described in U.S. 3,013,894. In the petroleum industry, metal-containing crystalline aluminosilicates are disclosed for such reactions as hydrocracking, hydrodesulfurization, hydroisomerization and the like. A brief discussion of crystalline aluminosilicates as conversion catalysts is given in Chemical Week, Nov. 14, 1964, page 77.

Although catalytically active metals can be composited with crystalline aluminosilicates by conventional impregnation means, it is generally much more preferred to exchange ions of the catalytically active metal into the structure of the aluminosilicate. The ion-exchange ability of crystalline aluminosilicates is well known, of course. In crystalline aluminosilicates, the electrovalence of the aluminum in the structure is balanced by the inclusion of a cation in the crystal. The cation is most commonly an alkali metal, such as sodium or potassium or mixtures thereof. The cations of either the synthetic or naturally occurring materials can be exchanged for other mono- or polyvalent cations which are of a suitable physical size and configuration to diffuse into the intra-crystalline passages in the aluminosilicate structure. The original metallic cation can be replaced by another metallic cation, by hydrogen ion or by ammonium ion. In general, any suitable salt solution such as the sulfate, the nitrate and the like can be used as a source of cations to be exchanged into the aluminosilicate.

The theoretical exchange capacity of the aluminosilicate is represented by the number of equivalents of cations, e.g. sodium ions which balance the electrovalence of the aluminum ions. Obviously the exchange capacity varies according to the particular type of sieve involved. In practice, not all of the cations in the aluminosilicate are readily replaced with the desired cations so that the effective exchange capacity is often somewhat less than the theoretical exchange capacity. The extent of the exchange depends on such factors as the type of sieve, cations in the sieve, cations to be exchanged, temperature of exchange, and the like. Clearly, there is a limit to the amount of catalytically active metal which can be ion-exchanged into the aluminosilicate.

It has now been found that catalytically active metals can be incorporated into crystalline aluminosilicates in excess of the amount conventionally ion-exchanged into the silicate, by conducting the ion-exchange under certain conditions of pH. Moreover, the resulting catalyst has a very high catalytic activity. Thus, in accordance with the present invention, catalytically active metal is ion-exchanged into a crystalline aluminosilicate from a solution containing a cation of the metal and having a pH above about 6. In general, the pH of the solution is in the range from about 6 to 12. The solution is used in an amount and concentration sufficient to incorporate the desired amount of excess active metal. The resulting aluminosilicate has total cations (added catalytically active metal cations as well as residual initial cations) greater than the original cation equivalent of the aluminosilicate. Any suitable cationic form of the aluminosilicate having exchangeable cations can be used. Aluminosilicates having in a silica/alumina ratio above about 2.5 and a pore size above about 5 A. are preferred catalysts.

Solutions having the proper pH range are generally prepared from metal salts of weak acids (e.g. those having an ionization constant of about $1 \times 10^{-4}$ and smaller), such as acetate, or salts of stronger acids, the solution of which has been rendered alkaline by the addition of, for example an amine or ammonium hydroxide. In this connection, sufficient amine should be added to provide a complex with the metal and thereby avoid precipitation of the metal.

How the excess metal is incorporated into the aluminosilicate and why it results in increased catalytic activity is not known. Large amounts of metal in excess of the effective exchange capacity of the aluminosilicate can be incorporated into the catalyst, yet the metal must be strongly adsorbed or reacted with the aluminosilicate in some manner since it remains on the aluminosilicate during the washing step and, therefore, is not merely impregnated on the aluminosilicate. Too, this interaction between the metal and the aluminosilicate apparently gives rise to the increased catalytic activity. The term "reacted metal" as used herein is to include actual ion-exchanged metal as well as excess metal reacted with the aluminosilicate in an unknown manner.

Catalytically active metals particularly adaptable for use in the present invention are those of the fourth period of the periodic table, i.e. those having atomic numbers from 20 to 32, inclusive, such as titanium, vanadium, chromium, iron group metals, copper, zinc and the like. The periodic table referred to in the specification and claims may be found in the Handbook of Chemistry and Physics, 39th Edition, Chemical Rubber Publishing Company (1957–1958). The iron group metals are preferred. These metals have relatively light atomic weights. When these light metals are ion-exchanged into a crystalline aluminosilicate in a normal manner, the resulting catalyst contains a relatively small amount of metal expressed as percent by weight of the catalyst. In the present invention, relatively large amounts, i.e. in excess of the exchange capacity of the aluminosilicate, of the metal are incorporated into the silicate to provide a highly active catalyst. On the other hand, heavier metals such as the platinum or palladium group metals, which are patricularly active metals and are widely used in zeolite catalysts, are quite heavy and can be conventionally ion-exchanged into the zeolites in quite large amounts, expressed as percent by weight. For example, platinum can be exchanged into a zeolite to provide as much as up to 30% w. platinum in the finished catalyst. These metals are quite expensive and are generally used in much lower amounts, i.e. about 1% w., quite below the effective exchange capacity of the zeolite. While the present method can be used to provide an excess of these heavy metals over the ion-exchange capacity of the sieve, the total amount of heavy metal added would be quite large and tend to make the cost of the catalyst excessive and uneconomical. Thus, in practice, the present invention is better suited for the light catalytically active metals. Where large amounts of the light metals are used in combination with a small amount of heavy metals, the light metals can be incorporated into the catalyst in accordance with the present invention and the heavy metals can be incorporated by conventional ion-exchange or impregnation.

The present catalysts are active conversion catalysts, and are highly suitable, for example, in hydroprocessing hydrocarbon oils, e.g. hydroisomerization of paraffins, hydrofining to remove sulfur, nitrogen, oxygen, hydrocracking, and the like. In general, hydroprocessing reactions are carried out at about 400 to 900° F., about 100 to 3000 p.s.i.g., 0.1–10 liquid hourly space velocity, and $H_2$/oil mole ratios of about 1–50.

For example, catalysts having a metal from Group VIII and/or the left-hand column of Group VI are highly active for hydrocracking hydrocarbon fractions to lower boiling fractions, e.g. to gasoline or kerosine fractions. Suitable hydrocracking feeds for hydrocracking to produce gasoline are those fractions which boil in the range from about 350–950° F., such as heavy oils, cracking cycle stocks, and the like. Residual oils can be used if desired, preferably after removal of asphaltenes such as by a solvent deasphalting process. Hydrocracking is generally carried out at a temperature of about 500° F. to 850° F., a hydrogen partial pressure of about 500 to 2000 p.s.i.a., a liquid hourly space velocity of about 0.2 to 5, and a hydrogen-to-oil mole ratio of about 5 to 50.

It is generally desirable to subject the hydrocracking feed to a suitable hydrofining treatment to convert organic sulfur, nitrogen and oxygen compounds to hydrogen sulfide, ammonia, and water respectively, which may or may not be removed prior to the hydrocracking reaction. The high activity of the present catalyst usually permits effluent from a hydrofining operation to be charged directly into a hydrocracker without removing ammonia, water, and the like.

EXAMPLE I

A sample of aluminosilicate designated as sodium Y-sieve (Union Carbide Corp.) containing 10.2% w. Na was ion-exchanged with 0.5 M nickel nitrate (pH 3.3) in a flask equipped with stirrer and reflux condenser. A total of four ion-exchanges were carried out, each for one hour with boiling solution. After each exchange, the sieve was filtered from the solution, washed with water, and recharged with fresh solution. After the final contact, the sieve was washed until the filtrate was free of exchange solution cation and anion. With this commonly used salt, only 9.5% w. nickel was exchanged into the sieve, 75% of the sodium being replaced. The nickel introduced was slightly less than the approximately 10% w. nickel required to replace the sodium removed.

In another experiment the sodium form of the sieve was converted into the ammonium form by ion-exchange with ammonium nitrate. The ammonium form of the sieve was then ion-exchanged four times with boiling 0.5 M nickel nitrate as described above for the sodium sieve. The finished sieve contained only 8.4% w. nickel. Similarly, the ammonium form of Y-sieve exchanged with nickel chloride (pH 3.8) and nickel sulfate (pH 3.6) resulted in 9.3% w. and 9.2% w. nickel, respectively. Thus, with salts giving a relatively low pH, the amount of nickel incorporated into the sieve is limited to about the effective exchange capacity of the sieve.

EXAMPLE II

This example demonstrates ion-exchange with natural and synthetic mordenite. The natural mordenite, activated by laboratory treatment with acid and then converted to the ammonium form, had an analysis as follows, expressed as percent by weight: 3.19 N, 0.64 Na, 1.1 K, 0.5 Fe, 0.13 Ti, 3.59 Al, and 36.3 Si. The synthetic mordenite was Na-Zeolon (Norton Co.) containing 4.9% w. sodium.

The mordenite was ion-exchanged with various 0.5 M nickel solutions at boiling temperature (except for ammoniacal nickel nitrate which was ion-exchanged at 55° C. in a closed system under pressure to avoid boiling off ammonia). In each case, the sieve was given a total of four separate exchanges, using fresh solution each time as described in the previous example. The results given below show that at a relatively high pH, a high concentration of nickel, in excess of the exchange capacity of the mordenite, is obtained. Total ion equivalents includes residual sodium, ammonium and the like ions as well as added nickel.

| Mordenite | Exchange solution | pH | Percent w. nickel | Total ion equivalents, percent of original [1] |
|---|---|---|---|---|
| Natural | 0.5 M Ni (OOCCH$_3$)$_2$ | 6.4 | 18.8 | 226 |
| Synthetic | 0.5 M Ni (OOCCH$_3$)$_2$ | 6.4 | 12.8 | 202 |
| Natural | 0.5 M Ni (NH$_3$)$_4$(NO$_3$)$_2$ | 11.2 | 15.2 | 183 |
| Do | 0.5 M Ni (NO$_3$)$_2$ | 3.3 | 2.4 | 29 |

[1] Based on original monovalent cations present.

EXAMPLE III

To demonstrate exchange of metals other than nickel, a sodium Y-sieve (10.2% w. Na) was exchanged with various metal salts. The results given in the table below, show that final equivalents of total metal cations (residual sodium plus exchanged metal) expressed as percent of original sodium cations, is in excess of the exchange capacity of the sieve when the acetate salt is used.

| | Sieve | | |
|---|---|---|---|
| Salt | Percent w. Na | Percent w. active metal | Total cations, percent of original Na cations |
| Cobalt nitrate | 2.0 | 8.9 | 89 |
| Cobalt acetate | 1.4 | 14.9 | 128 |
| Copper nitrate | 1.3 | 11.7 | 96 |
| Copper acetate | 1.5 | 17.4 | 138 |

EXAMPLE IV

In this experiment, a hydrogen form of Y-sieve (prepared from sodium Y-sieve by exchanging ammonium ions from ammonium nitrate solution and then calcining the ammonium form at 1112° F. for one hour) was exchanged with 0.5 M solutions of various nickel salts. The amount of nickel incorporated into the sieve is shown in the table below.

| Salt | pH | Percent w. nickel in sieve |
|---|---|---|
| Nickel acetate | 6.4 | 14.3 |
| Nickel formate | 5.9 | 6.2 |
| Nickel nitrate | 3.3 | 3.3 |

EXAMPLE V

A series of catalysts was prepared by exchanging nickel ions from a nickel acetate solution (pH 6.4) into a Y-sieve. The original sieve contained 10.2% w. sodium. In some instances, nickel was ion-exchanged directly with the sodium sieve. About 75% of the sodium was replaceable with nickel. In other instances, the nickel was exchanged into other forms of the sieve, obtained by exchanging at least a portion of the sodium with other ions such as hydrogen, aluminum, or ammonium ions. The ion exchange was carried out by slurrying the sieve with exchange solution for one hour at the boiling point. With some catalysts multiple one-hour contact periods were used. In multiple contacts, the sieve was filtered from the solution after each exchange period, washed with water, and recharged with fresh exchange solution. After the final contact, the sieve was washed thoroughly with water until the filtrate wash was free of exchange cations and anions.

These catalysts were employed to crack Decalin (contaminated with 2000 p.p.m. S) at 617° F. (325° C.), 1500 p.s.i.g., 15 LHSV, and 10 $H_2$/Decalin mole ratio. The catalysts were treated prior to use with $H_2$ at 707° F. (375° C.), and 1 atm. for 2 hours and with $H_2/H_2S$ (10/1 molar) at 707° F. (375°.) at 1 atm. for 2 hours. The results are tabulated below.

| Form of Y-zeolite | Percent Ni | Cracking activity, percent w. $C_9-$ |
|---|---|---|
| Al | 18 | 22.2 |
| H* | 14.3 | 16.4 |
| Na | 13.2 | 12.5 |
| $NH_4$ | 12.4 | 7.6 |
| Na | 10.4 | 6.3 |
| Na | 9.4 | 5.6 |
| $NH_4$-Ca | 5.7 | 4.9 |
| Na | 4.9 | 5.1 |

*From calcined $NH_4$ form.

It can readily be seen that cracking activity is substantially constant up to a nickel content of about 10% w. This concentration of nickel corresponds to that exchanged for all of the readily replaceable sodium (approximately 75% of the original sodium) in the sieve. Activity is markedly increased as excess nickel is incorporated into the sieve.

EXAMPLE VI

In this experiment, ammonium Y-sieve (prepared from sodium Y-sieve by exchange with ammonium nitrate) was impregnated with a large amount of nickel. The sieve was impregnated with a concentrated solution of nickel nitrate by total absorption, heated to 572° F. to decompose the nitrate, pelleted, and calcined at 1112° F. The impregnated catalyst contained 15.9% w. nickel. This catalyst, when tested for Decalin cracking as described in Example V above, resulted in a Decalin conversion to $C_9$ and lighter of 11.7% w.

In a similar test, a sieve containing 9.8% w. nickel (slightly below exchange capacity of the sieve) and prepared by ion-exchange from 0.5 M nickel nitrate solution resulted in 12.2 % w. $C_9$ and lighter.

From these results, it can be seen that a large amount of nickel does not of itself tend to give any increase in convension over conventional ion-exchanged nickel catalyst.

EXAMPLE VII

To demonstrate hydrocracking of high boiling hydrocarbon fractions, a blend of 40% w. catalytically cracked light gas oil (434/626° F. ASTM IBP/EP) and 60% w. catalytically cracked heavy gas oil (568/746° F. ASTM IBP/90%) was hydrofined under conditions to reduce organic nitrogen content to 0.5 p.p.m. N. The hydrofined gas oil, contaminated with 500 p.p.m. ammonia, 3.0% w. sulfur, and 0.1% oxygen, was hydrocracked with a catalyst comprising Y-sieve having 13.1% nickel (about 120% of original Na equivalents) incorporated therein by ion-exchange of sodium Y-sieve with nickel acetate solution. Hydrocracking conditions were 1600 p.s.i.g., 0.5 LHSV, 15/1 $H_2$/oil mole ratio. Temperature was adjusted as necessary to provide a conversion of 67% w. to products boiling below 385° F., higher boiling products being recycled. Results shown below demonstrate the good results even with the large amount of ammonia present. Nitrogen compounds are generally known as a poison to hydrocracking catalysts.

Temp., °F. _____ 739
$H_2$ Uptake, SCF/Bbl _____ 1570
Yields, percent weight:
   $C_1-C_3$ _____ 5.4
   $C_4$ _____ 12.9
   $C_5-C_6$ _____ 26.6
   $C_{7+}$ _____ 54.4
Iso/normal ratio:
   $C_4$ _____ 1.7
   $C_5$ _____ 11.5
   $C_6$ _____ 18.4

I claim as my invention:
1. A crystalline aluminosilicate having a catalytically active metal selected from fourth period of the periodic table, having an atomic number of from 20 to 32, inclusive, reacted therewith in an amount such that the total cation equivalents comprising said metal and residual exchange cations is in excess of the exchange cation equivalents in the original aluminosilicate as determined by the aluminum ion content comprising the crystalline structure, the metal having been reacted with the original aluminosilicate from an aqueous solution of a salt of the catalytically active metal having a pH above about 6, and unreacted metal solution having been removed by washing.

2. The crystalline aluminosilicate of claim 1 wherein the solution is an ammoniacal solution of the catalytically active metal salt.

3. The crystalline aluminosilicate of claim 1 wherein the catalytically active metal salt is an acetate.

4. The crystalline aluminosilicate of claim 2 wherein the catalytically active metal is nickel.

5. The crystalline aluminosilicate of claim 3 wherein the catalytically active metal is an iron group metal.

6. A process for converting hydrocarbons in the presence of hydrogen at a temperature of about 400–900° F., about 100 to 3000 pounds per square inch gauge with the catalyst of claim 1 comprising a crystalline aluminosilicate having a catalytically active metal reacted therewith in an amount such that total cation equivalents comprising said metal and residual exchange cations is greater than the exchange cation equivalents in the original aluminosilicate as determined by the aluminum ion content comprising the crystalline structure.

7. The process according to claim 6 wherein the hydrocarbon conversion is hydrocracking carried out at a temperature of about 500 to 850° F. and a hydrogen partial pressure of about 500 to 2000 pounds per square inch.

8. The process according to claim 6 wherein the reaction is effected with an aqueous solution of a salt of the catalytically active metal and having a pH about 6.

9. The process according to claim 7 wherein the catalytically active metal is a Group VIII metal.

10. The process according to claim 9 wherein the Group VIII metal is nickel and the reaction is effected from a solution of a nickel salt having a pH above about 6.

11. The process according to claim 10 wherein the solution is selected from the group consisting of nickel acetate and ammoniacal nickel.

References Cited

UNITED STATES PATENTS 3,140,253  7/1964  Plank et al. _____ 208—120

DELBERT E. GANTZ, *Primary Examiner.*

ABRAHAM RIMENS, *Assistant Examiner.*